United States Patent [19]
Dehmlow

[11] Patent Number: 5,973,760
[45] Date of Patent: Oct. 26, 1999

[54] DISPLAY APPARATUS HAVING QUARTER-WAVE PLATE POSITIONED TO ELIMINATE CONFLICTS WITH POLARIZED SUNGLASSES

[75] Inventor: Brian P. Dehmlow, Cedar Rapids, Iowa

[73] Assignee: Rockwell Science Center, Inc., Thousand Oaks, Calif.

[21] Appl. No.: 08/907,350

[22] Filed: Aug. 6, 1997

[51] Int. Cl.⁶ .......................... G02F 1/1335; G02G 5/00
[52] U.S. Cl. ........................ 349/102; 349/11; 345/7; 345/8
[58] Field of Search ................. 349/102, 15, 11; 359/643; 345/7, 8

[56] References Cited

U.S. PATENT DOCUMENTS

| | | | |
|---|---|---|---|
| 3,876,287 | 4/1975 | Sprokel | 349/117 |
| 4,088,400 | 5/1978 | Assouline et al. | 349/102 |
| 5,066,108 | 11/1991 | McDonald | 349/97 |
| 5,576,854 | 11/1996 | Schmidt et al. | 359/40 |
| 5,686,975 | 11/1997 | Lipton | 349/15 |

*Primary Examiner*—William L. Sikes
*Assistant Examiner*—Kari M. Horney
*Attorney, Agent, or Firm*—Kyle Eppele; James P. O'Shaughnessy

[57] ABSTRACT

A display apparatus adapted for viewing by a person wearing linearly polarized lenses, such as sunglasses, is disclosed. The display apparatus includes a display device, such as an LCD or a filtered TFEL display, which displays information by providing as an output linearly polarized light travelling toward the person viewing the display apparatus. A quarter-wave plate is positioned between the display device and the linearly polarized lenses of the sunglasses. The quarter-wave plate receives the linearly polarized light from the display device as an input and provides as an output circularly polarized light which passes through the linearly polarized lenses of the sunglasses substantially without attenuation.

20 Claims, 3 Drawing Sheets

DISPLAY APPARATUS HAVING QUARTER-WAVE PLATE POSITIONED TO ELIMINATE CONFLICTS WITH POLARIZED SUNGLASSES

FIELD OF THE INVENTION

The present invention relates to polarized displays such as liquid crystal displays (LCDs) and filtered thin film electro-luminescent (TFEL) displays. More particularly, the present invention relates to an apparatus which eliminates conflicts between polarized displays and linearly polarized eyeglasses or lenses of a person viewing the display such that light from the display passing through the lenses is minimally attenuated, and independent of the viewer's head location and orientation.

BACKGROUND OF THE INVENTION

Display systems which output linearly polarized light (such as LCDs or filtered TFEL displays) cannot be used in avionics or automotive applications while the viewer is also wearing linearly polarized lenses such as sunglasses. If not aligned with the transmission axis of the polarized lenses, the linearly polarized light from the display is attenuated by the linearly polarized lenses. This can result in lowered display brightness and visibility, and even complete obscuration of the display.

As a result, manufacturers and users of avionics and automotive displays are forced to make a choice between wearing linearly polarized glasses for improved glare reduction, or using the latest technology which is based upon polarization optics. With the increased demand for use of LCDs in both automotive and avionics applications, this presents a significant problem for current and future display systems.

SUMMARY OF THE INVENTION

A display apparatus adapted for viewing by a person wearing linearly polarized lenses is disclosed. The display apparatus includes a display device, such as an LCD or a filtered TFEL display, which displays information by providing as an output linearly polarized light travelling toward the person viewing the display apparatus. A quarter-wave plate is positioned between the display device and the polarized lenses. The quarter-wave plate receives the linearly polarized light from the display device as an input and provides as an output circularly polarized light which passes through the polarized lenses substantially without attenuation.

BRIEF DESCRIPTION OF THE DRAWINGS

The invention may be more fully understood by reading the following description of a preferred embodiment of the invention in conjunction with the appended drawings wherein.

DETAILED DESCRIPTION OF THE PREFERRED EMBODIMENTS

Figure 1:
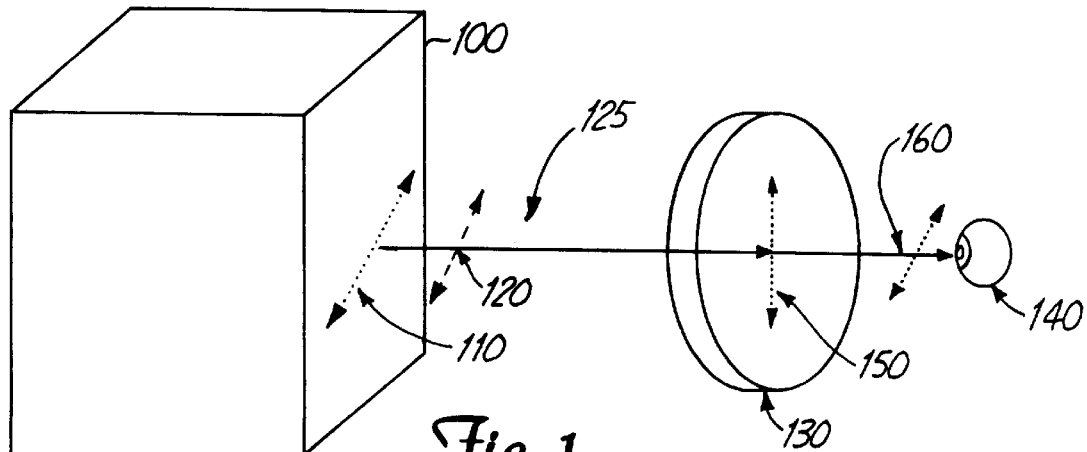
FIG. 1 is a diagrammatic view illustrating the interaction between a prior art polarized light display and the polarized lens of a viewer.

FIG. 1 is a diagrammatic illustration of a conventional polarized light display 100 of the type well known in the art. Display 100 can be, for example, an LCD or a filtered TFEL display which has an output transmission axis 110 causing light 120 emitted from display 100 in the direction of viewer 140 to be linearly polarized light. Output transmission axis 110 can be, for example, the transmission axis of an analyzer layer in an LCD. As used herein, the term LCD is also intended to include devices having optical compensation films, for example between the polarizer and analyzer. Linearly polarized light 120 traveling along illustrated ray 125 toward viewer 140 will have an electric field which oscillates in the direction defined by axis 110.

Viewer 140 is wearing eyeglasses, sunglasses or other eye wear having linearly polarized lenses 130. Each polarized lens 130 has a transmission axis 150. As linearly polarized light 120 passes through lens 130, it will be attenuated by lens 130 if it is not aligned with axis 150. The degree of attenuation is determined by the equation:

$$I(\theta)=I(O)\cos^2\theta \qquad \text{Eq. 1}$$

where $\theta$ is equal to the angle between axis 110 and axis 150, and $I(0)$ is the unattenuated image brightness when $\theta$ is equal to zero. The result is that linearly polarized light 160 which reaches viewer 140 will be attenuated when axis 110 and axis 150 are not parallel such that the display image will have low display brightness and visibility, if it is visible at all.

Figure 2:
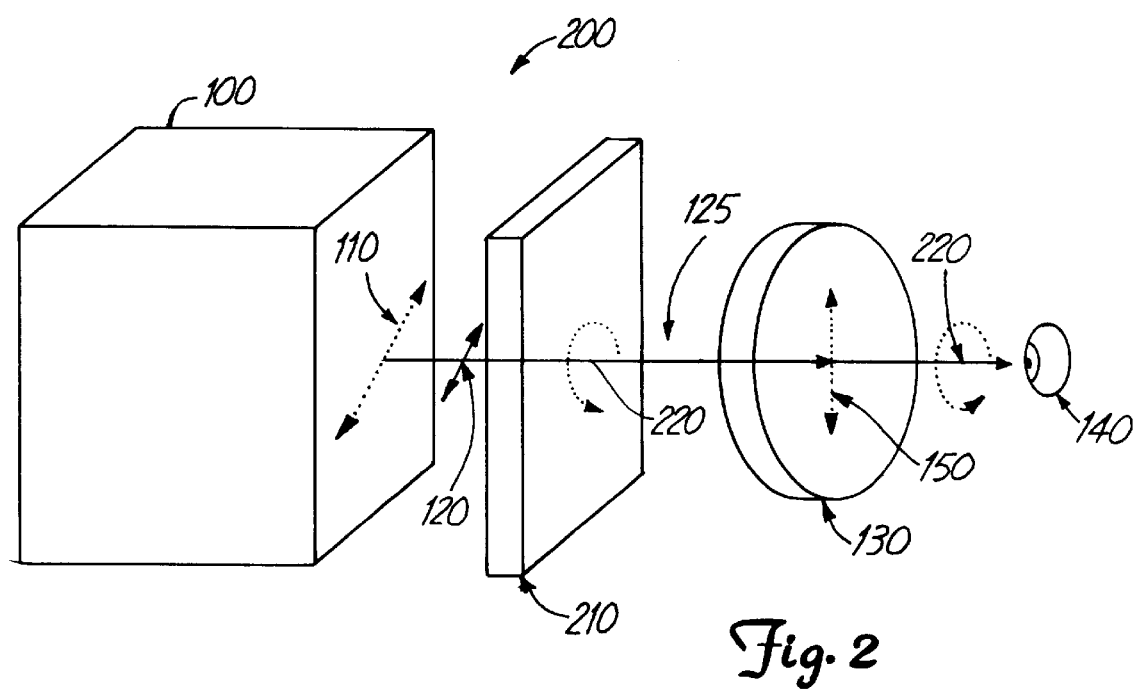
FIG. 2 is a diagrammatic illustration of the interaction between the compensated polarized light display of the present invention and the polarized lens of the viewer.

FIG. 2 is a diagrammatic illustration of display apparatus 200 in accordance with preferred embodiments of the present invention. Apparatus 200 includes display device 100 having output transmission axis 110 and thereby producing linearly polarized light 120 traveling along ray 125 toward viewer 140. Light 120 will have an electric field which oscillates in the direction of axis 110. Display apparatus 200 also includes a quarter-wave retarder or plate 210 positioned between display device 100 and linearly polarized lens 130 of viewer 140. As is discussed below in greater detail with reference to FIG. 3, the fast/slow axes of quarter-wave plate 210 are oriented relative to output transmission axis 110 of display device 100 such that, as linearly polarized light 120 passes through quarter-wave plate 210, it is converted into circularly polarized light 220. The orientations of the fast/slow axes of quarter-wave plate 210 can be controlled or established such that circularly polarized light 220 will be left circularly polarized (LCP) light or right circularly polarized (RCP) light. Generally, either of these left and right circular helicities will work equally well.

Quarter-wave plate 210 can be any retardation plate or layer of the type well known in the art with a retardation value equal to one quarter of the wavelength of the light passing through the plate. In other words, for light having a wavelength of 560 nm, quarter-wave plate 210 will provide a retardation of 140 nm. Specifically, quarter-wave plate 210 is an anisotropic optical element that satisfies the following equation:

$$4t(n_e-n_o|)=(4m+1)\lambda \qquad \text{Eq. 2}$$

where: t=thickness of retarder layer;
ne=extraordinary index of refraction;
no=ordinary index of refraction;
m=non-negative integer (0, 1, 2, 3, . . . );
λ=wavelength of transmitted light.

With quarter-wave plate 210 aligned in rotation relative to output transmission axis 110 to produce circularly polarized light 220, the circularly polarized light will pass through linearly polarized lens 130 without significant attenuation. Thus, viewer 140 will see a full intensity display image, thereby eliminating the detrimental effects previously associated with the use of polarized sunglasses or other polarized lenses. Further, since the human eye is insensitive to the polarization state of light, inclusion of quarter-wave plate 210 in display apparatus 200 will have no effect on the visual quality of the display image seen by viewer 140, with or without the use of linearly polarized lens 130.

Figure 3:
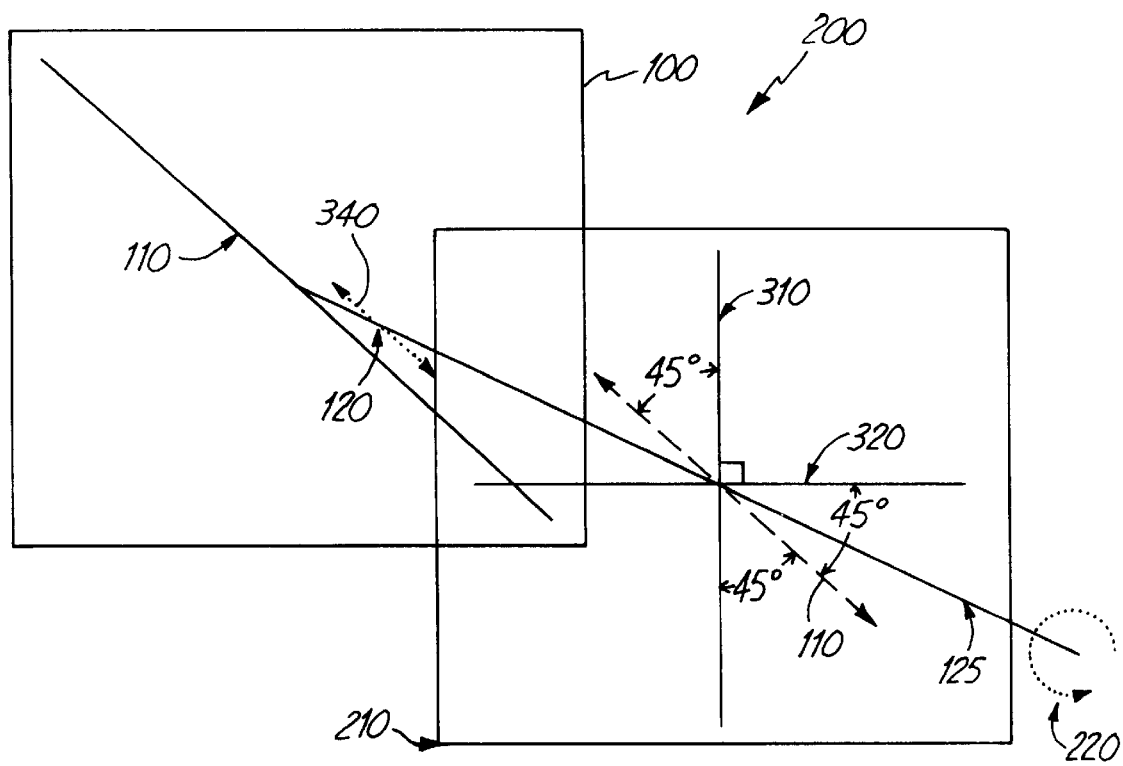
FIG. 3 is a diagrammatic illustration of the compensated polarized light display of the present invention which shows the orientation of the fast/slow axes of the quarter-wave retarder plate relative to an output polarization axis of the display.

FIG. 3 is a diagrammatic exploded view of display apparatus 200 shown in FIG. 2, but which illustrates the alignment of the fast/slow axes of quarter-wave plate 210 with respect to output transmission axis 110 of display device 100. While FIG. 3 is exploded diagrammatically to simultaneously show both the various polarization states 120 and 220 of light traveling along ray 125, and the orientation of the fast/slow axes of quarter-wave plate 210, it should be understood that quarter-wave plate 210 will actually be positioned directly in front of display device 100. In other words, illustrated light ray 125 is actually perpendicular to all of axes 110, 310 and 320 in this particular example. In still other words, illustrated ray 125 is normal to both the front surface of display 100 and both surfaces of quarter-wave plate 210. It should be understood that the present invention applies as well to light rays oblique (i.e., non-normal) to display 100 and quarter-wave plate 210.

As can be seen in FIG. 3, display device 100 includes output transmission axis 110 which causes light 120 traveling along ray 125 prior to entry into quarter-wave plate 210 to have a linear polarization. In other words, the electric field of light 120 will oscillate in the direction of axis 340 which is parallel to output transmission axis 110. Quarter-wave plate 210 includes fast axis 310 and slow axis 320, which are by definition perpendicular to one another. Fast axis 310 represents the direction in which quarter-wave plate 210 has a first index of refraction (n1). Slow axis 320 represents the direction in which quarter-wave plate 210 has a second index of refraction (n2) which is higher than the first index of refraction (n2>n1).

It must be noted that, for purposes of the present invention, it is not important which of axes 310 and 320 illustrated in FIG. 3 actually represent the fast axis and the slow axis of quarter-wave plate 210. In order to convert linearly polarized light 120 traveling along ray 125 into circularly polarized light 220, the fast and slow axes 310 and 320 of quarter-wave plate 210 should each be oriented at an angle of substantially 45 degrees relative to the orientation of output transmission axis 110 of display device 100. For ease of illustration, output transmission axis 110 is duplicated on the illustration of quarter-wave plate 210 to further demonstrate this fact. As mentioned previously, since it is not of particular importance which of axes 310 and 320 represent the fast and slow axes, the angles formed between output transmission axis 110 and either of fast and slow axes 310 and 320 can be any of a variety of representations of 45 degrees (e.g., 135 degrees or 315 degrees). Regardless of the specific orientations of axes 310 and 320, if the angles formed between each of axes 310 and 320 and axis 110 are substantially equal to 45 degrees, the result is that linearly polarized light 120 will be converted into circularly polarized light 220. The specific orientations of axes 310 and 320 with respect to axis 110 will determine whether the circularly polarized light 220 exhibits left or right-hand rotation. The circularly polarized light will pass through linearly polarized lens 130 essentially unattenuated.

Figure 4:
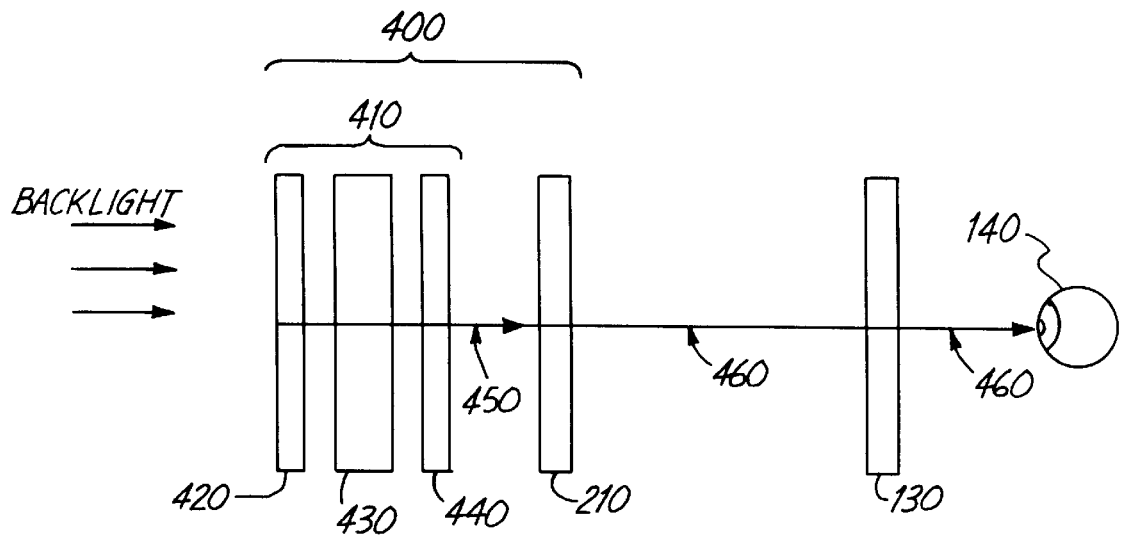
FIG. 4 is a diagrammatic side view illustrating embodiments of the present invention in which the polarized display device is an LCD.

FIG. 4 is a diagrammatic illustration of the display apparatus of the present invention in which the display device is an LCD. Display apparatus 400 includes LCD 410 and quarter-wave plate 210. Thus, LCD 410 acts as display device 100 illustrated in the above Figures. LCD 410 includes input polarizing layer (or polarizer) 420, liquid crystal layer 430 and output polarizing layer (or analyzer) 440. Although for ease of illustration the various layers of display apparatus 400 are shown spatially separated, in preferred embodiments, these various layers are stacked upon one another, separated only by a transparent adhesive or other material.

In operation, polarizer 420 of LCD 410 receives unpolarized light from a backlight. Polarizer 420 linearly polarizes the light to achieve a particular polarization rotational orientation chosen for the particular polarizer/liquid crystal layer/analyzer combination. The linearly polarized light passes through liquid crystal layer 430 and into analyzer layer 440. Analyzer layer 440 includes a transmission axis which functions as output transmission axis 110 of display device 100 illustrated in the previous Figures. The result is that light 450 transmitted by analyzer layer 440 is linearly polarized. With the fast and slow axes of quarter-wave plate 210 oriented at 45 degree angles relative to the transmission axis of analyzer 440, quarter-wave plate 210 converts linearly polarized light 450 into circularly polarized light 460. As discussed above, circularly polarized light 460 passes through linearly polarized lens 130 substantially without attenuation. Thus, viewer 140 sees the full display brightness.

Figure 5:
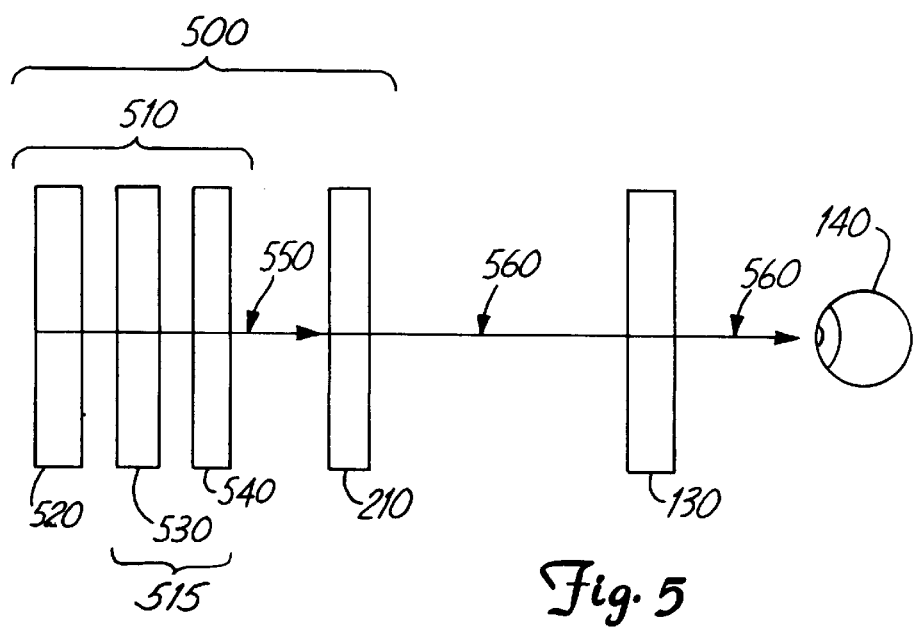
FIG. 5 is a diagrammatic side view illustrating embodiments of the present invention in which the polarized display device is a filtered TFEL display.

FIG. 5 is a diagrammatic illustration of embodiments of the present invention in which the display device is a filtered TFEL display. Thus, display apparatus 500 includes TFEL display 510 and quarter-wave plate 210. As was the case with display apparatus 400, while the various layers of display apparatus 500 are shown separated for ease of illustration, they will actually be stacked upon one another in close proximity.

TFEL display 510 includes phosphor layer 520 for emitting light in a controllable manner, quarter-wave plate 530 and output linear polarizer 540. Quarter-wave plate 530 and linear polarizer 540 together form circular polarizer 515. Circular polarizer 515 is intended to control specular (i.e., mirror-like) reflections from display 510, in the manner well-known in the industry. Unpolarized light from phosphor layer 520, which passes through quarter-wave retarder 530 and output linear polarizer 540, is converted into linearly polarized light 550. With the fast and slow axes of quarter-wave plate 210 oriented at 45 degree angles relative to the transmission axis of output linear polarizer 540, linearly polarized light 550 is converted into circularly polarized light 560 which passes through linearly polarized lens 130 substantially without attenuation. Thus, viewer 140 sees a substantially full brightness display image, regardless of his/her use of linearly polarized lens 130.

As is clear from the above discussions, the present invention utilizes the addition of a quarter-wave plate to a display assembly in order to eliminate the interaction of polarized light from the display with polarized lenses. The quarter-wave plate will typically be permanently bonded to the display device at a position between the output linear polarizer of the display device and the polarized lenses of the user. The preferred method of bonding is to cement plate 210 directly to display 100 by filling the intervening space with an optically clear, isotropic adhesive. The distance between display 100 and plate 210 shall be as narrow as practical. When bonded, the front surface of display 100 will be parallel to the rear surface of quarter-wave plate 210. With the quarter-wave plate aligned in rotation to achieve a specific orientation with respect to the output polarization of the light, the linearly polarized light from the display is converted into circularly polarized light which will pass through the linearly polarized lenses without attenuation. Thus, the present invention allows polarized displays to be viewed by a person wearing linearly polarized sunglasses. Consequently, the latest display technology can be used in automotive and avionics applications, in which the viewer is likely to wear linearly polarized sunglasses or other lenses, without sacrificing display quality.

Although the present invention has been described with reference to preferred embodiments, workers skilled in the art will recognize that changes may be made in form and detail without departing from the spirit and scope of the invention.

What is claimed is:

1. A display apparatus adapted for viewing by a person wearing linearly polarized lenses, the display apparatus comprising:
    a display device for displaying information, the display device providing as an output linearly polarized light travelling toward the person; and
    a -quarter-wave plate coupled to the display device and positioned between the displays device and the person, the quarter-wave plate being so disposed and arranged such that it receives the linearly polarized light from the display device as an input and provides as a display apparatus output circularly polarized light travelling toward the person which remains circularly polarized until being received by the linearly polarized lenses worn by the viewer.

2. The display apparatus of claim 1, wherein the display device has an output axis which defines a direction of oscillation of an electric field associated with the linearly polarized light, wherein the quarter-wave plate has a fast axis and a slow axis, wherein each of the slow axis and the fast axis is oriented such that it forms an angle with the output axis of the display of approximately 45 degrees.

3. The display apparatus of claim 2, wherein the quarter-wave plate retarder is attached to the display device in a position between the display device and the person.

4. The display apparatus of claim 3, wherein the display device includes a liquid crystal display.

5. The display apparatus of claim 4, wherein the liquid crystal display includes a polarizer layer, a liquid crystal layer and an analyzer layer, wherein a transmission axis of the analyzer layer acts as the output axis of the display device, and wherein each of the slow axis and the fast axis of the quarter-wave plate is oriented such that it forms an angle with the transmission axis of the analyzer of approximately 45 degrees.

6. The display apparatus of claim 3, wherein the display device includes a filtered thin film electro-luminescent (TFEL) display.

7. The display apparatus of claim 6, wherein the filtered TFEL display includes a phosphor layer, a second quarter-wave plate and a linear polarizer, wherein a transmission axis of the linear polarizer acts as the output axis of the display device, and wherein each of the slow axis and the fast axis of the quarter-wave plate of the display apparatus is oriented such that it forms an angle with the transmission axis of the linear polarizer of approximately 45 degrees.

8. A display for displaying information and adapted for viewing by a person wearing a linearly polarized lens, the polarized lens having a transmission axis, the display comprising:
    a display device having an output linear polarizing layer such that the display device provides as an output linearly polarized light travelling toward the person; and
    a polarization conversion layer coupled to the display device at a position between the output linear polarizing layer and the polarized lens worn by the person, the polarization conversion layer being so disposed and arranged on the display such that it is adapted to receive the linearly polarized light from the display devce and to convert the linearly polarized light into circularly polarized light which remains circularly polarized until being received by the polarized lens of the person.

9. The display of claim 8, wherein the polarization conversion layer includes a quarter-wave plate positioned between the output linear polarizing layer of the display device and the linearly polarized lens worn by the person, the quarter-wave plate receiving the linearly polarized light from the display device as an input and providing as an output circularly polarized light travelling toward the person.

10. The display of claim 9, wherein the output linear polarizing layer of the display device has an output axis which defines a direction of oscillation of an electric field associated with the linearly polarized light provided by the display device, wherein the quarter-wave plate has a fast axis and a slow axis, wherein each of the slow axis and the fast axis is oriented such that it forms an angle with the output axis of the display of approximately 45 degrees.

11. The display of claim 10, wherein the quarter-wave plate is attached to the display device in a position between the display device and the person.

12. The display of claim 11, wherein the display device includes a liquid crystal display.

13. The display of claim 12, wherein the liquid crystal display includes a polarizer layer, a liquid crystal layer and an analyzer layer, wherein a transmission axis of the analyzer layer acts as the output axis of the display device, and wherein each of the slow axis and the fast axis of the quarter-wave plate is oriented such that it forms an angle with the transmission axis of the analyzer of approximately 45 degrees.

14. The display apparatus of claim 11, wherein the display device includes a filtered thin film electro-luminescent (TFEL) display.

15. The display apparatus of claim 11, wherein the filtered TFEL display includes a phosphor layer, a second quarter-wave plate and the output linear polarizing layer.

16. An apparatus for displaying information and adapted for viewing by a person wearing a linearly polarized lens, the apparatus comprising:
    a display device providing as an output linearly polarized light;
    a quarter-wave plate retarder coupled to the display device and positioned between the display device and the lens worn by the person viewing the information displayed by the apparatus, the quarter-wave plate being oriented and so disposed and arranged on the apparatus such that it receives the linearly polarized light as an input and provides as an output circularly polarized light, the circularly polarized light through the polarized lens substantially without remaining circularly polarized until being received by the linearly polarized lens worn by the person.

17. The apparatus of claim 16, wherein the display device includes a linear polarizing layer, the linear polarizing layer of the display device having an output axis which defines a direction of oscillation of an electric field associated with the linearly polarized light provided by the display device, wherein the quarter-wave plate has a first axis oriented in a first direction in which the quarter-wave plate has a first index of refraction, and wherein the quarter-wave plate has a second axis oriented in a second direction in which the quarter-wave plate has a second index of refraction, the first index of refraction being lower than the second index of refraction, wherein the first and second axes are oriented substantially perpendicular to one another, and wherein each of the first and second axes are oriented at an angles relative to the output axis of the linear polarizing layer of approximately 45 degrees.

18. The apparatus of claim 17, wherein the display device includes a liquid crystal display.

19.. The apparatus of claim 18, wherein the liquid crystal display includes a polarizer layer, a liquid crystal layer and an analyzer layer, wherein the analyzer layer acts as the linear polarizing layer, wherein a transmission axis of the analyzer layer acts as the output axis of the linear polarizing layer, and wherein each of the first and second axes of the quarter-wave plate retarder are oriented at angles relative to the transmission axis of the analyzer of approximately 45 degrees.

20. The apparatus of claim 17, wherein the display device includes a filtered thin film electro-luminescent (TFEL) display.

* * * * *